Nov. 26, 1940.    J. JACOBSON ET AL    2,222,666
SAFETY DEVICE FOR MOVING PICTURE PROJECTORS
Filed March 22, 1939    2 Sheets-Sheet 1
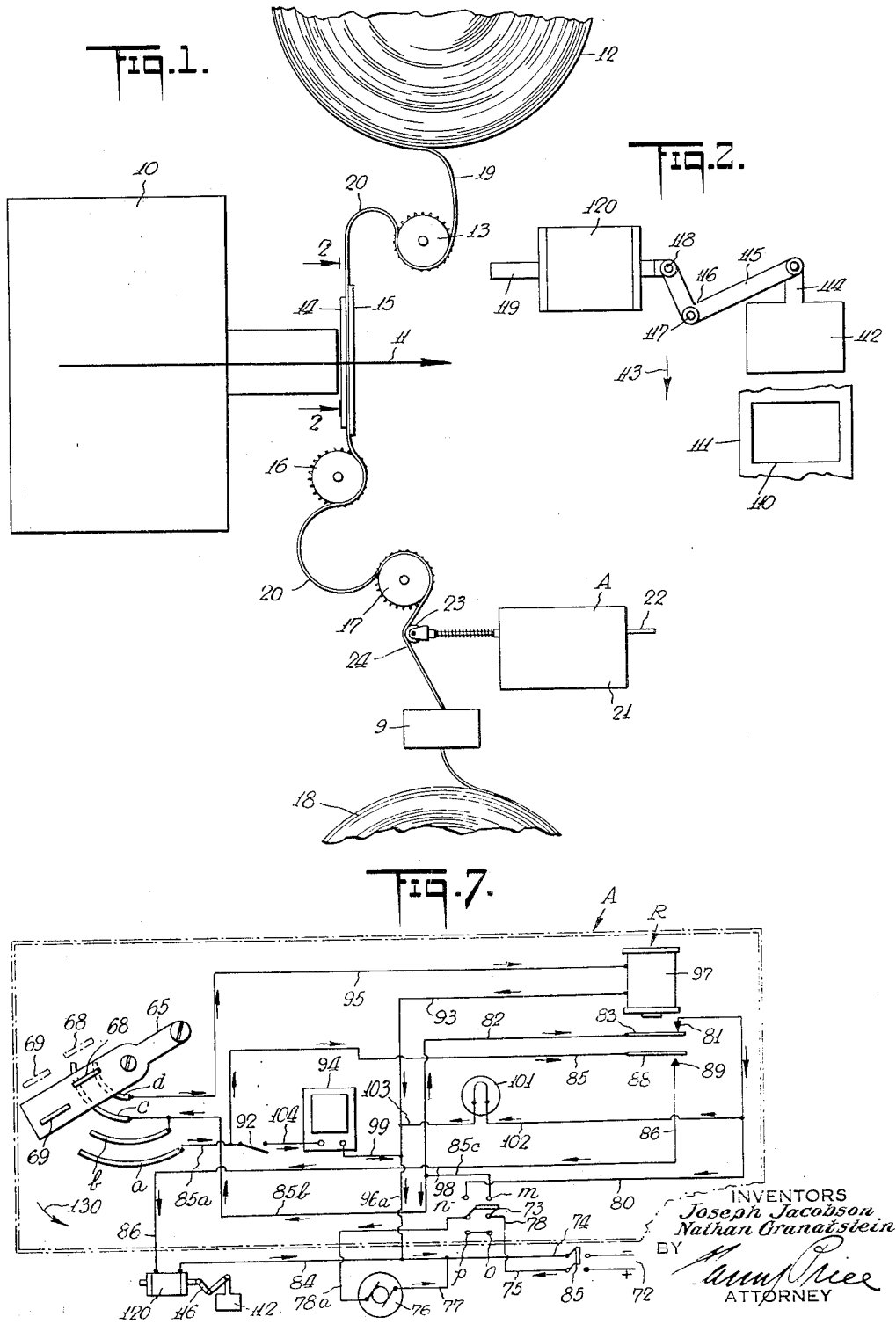

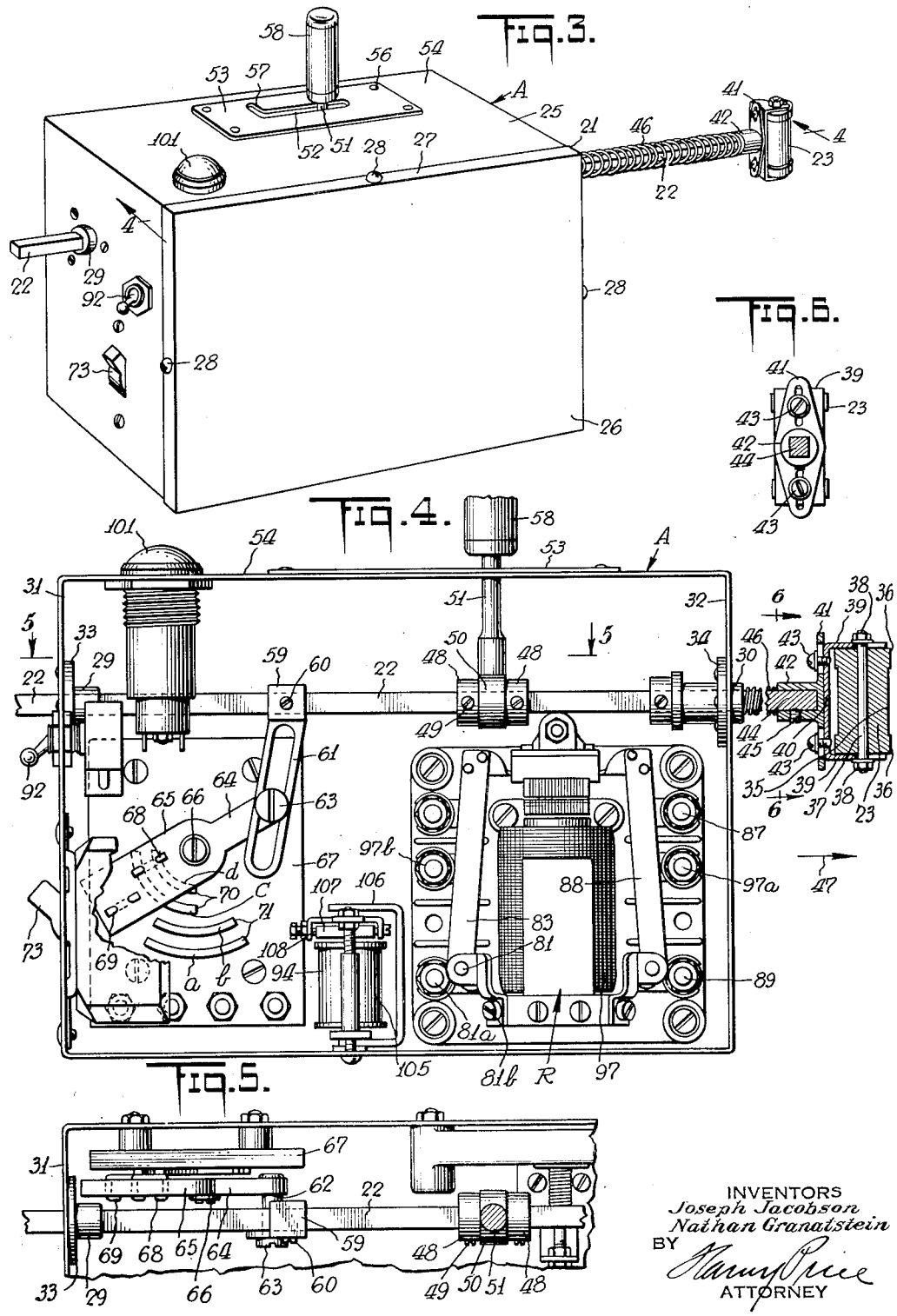

Patented Nov. 26, 1940

2,222,666

UNITED STATES PATENT OFFICE 2,222,666

SAFETY DEVICE FOR MOVING PICTURE PROJECTORS

Joseph Jacobson and Nathan Granatstein, Brooklyn, N. Y.

Application March 22, 1939, Serial No. 263,322

4 Claims. (Cl. 177—311)

The present invention relates to a safety device for motion picture projectors and it particularly relates to a safety device which may be actuated upon breakage or jamming of the film and thus reduce the possibility of fire in and around the projection apparatus in case of a mishap to the film.

In the usual type of motion picture projector the film is carried from a feed reel to a take-up reel across a very powerful beam of light having a very high heating effect.

If the film intercepts such beam of light and does not move rapidly through the beam, the film would be heated up sufficiently in relatively short time to the ignition point and would readily take fire.

Most moving picture apparatus are therefore designed to cause movement of the film across the beam of light at such a rate and with such blocking devices as may cut off the light momentarily as each frame passes, so that there will be insufficient opportunity for the film to heat up with resultant tendency toward ignition.

However, in case there is any breakage in the film or other mishap in the apparatus which causes the feed and movement of the film across the power of the beam of light, the film may block up or jam up in such a way that a portion of it will be exposed or be held in the beam of light a sufficient length of time to cause ignition, and it is among the objects of the present invention to provide a safety device which will so cooperate with the film and control the passage thereof as to shut off the projector and also the light in such a short time as to eliminate the possibility of fire.

Another object of the present invention is to provide a signal system for a moving picture projector which will first give warning of any mishap to the film in passing through the projecting apparatus and will then shut off the projector altogether if there is any tendency of ignition.

Still further objects and advantages will appear from the more detailed description set forth below, it being understood, however, that this more detailed description is given by way of illustration, since various changes therein may be made by those skilled in the art without departing from the scope and spirit of the invention.

In accomplishing the above objects, it has been found most satisfactory according to one embodiment of the present invention to provide a follower member which may cooperate with or contact the film in its passage between the feed and take-up reels, which will be connected to a suitable electrical circuit to close or open said circuit as the case may be and to cut off the beam of light and/or cause stoppage of the machine and projector where the film has blocked or jammed up or becomes loose and there is possibility of ignition thereof.

In one form of the device, a roller is caused to contact with the film and is provided with a rod connected to a linkage actuating a sliding switch. This switch has a contact member which rides over two arcuate contact elements when the film is in normal actuating position, closing a circuit, which in turn energizes and closes a relay switch.

When the contact member moves off the contact elements, the circuit will be opened, the relay switch will be opened and a shutter will be operated to cut off the beam of light.

Desirably the roller is so arranged as to contact with the film after it has passed through the beam of light and just before it is about to pass through the sound head or onto the roller take-up reel, as this has been found the most satisfactory position for precautions against jammings or breakages in the film.

It has also been found quite satisfactory to arrange an auxiliary signal circuit, which may actuate either a buzzer or light or both to indicate when the contactor is about to pass off the contacts and open the circuit and for this latter purpose an auxiliary contactor or switch may be provided with two additional contact elements. The circuit across this auxiliary switch is closed just before the circuit controlling the machine relay is opened, so that there will be a preliminary buzzing or light indication, signalling the operator that there is danger and that the film is not functioning in the proper manner in passing from the feed reel to the take-up reel.

When the signal has been given in the preferred form of invention and when the circuit is broken, to assure that the beam of light will be immediately cut off, it has been found most satisfactory to use a solenoid control which will immediately place a shutter across the beam of light and prevent further heating of the film and possible ignition thereof.

At the same time, if desired, the relay control may also be actuated to cause a cut off for the motor of the machine and a stoppage of the feed of current to the arc light or other source of illumination.

Referring to the drawings which illustrate several of the various possible embodiments of the present invention, but to which the present invention is by no means restricted, since the drawings are merely by way of illustration and not by way of limitation.

Fig. 1 is a diagrammatic side view illustrating the feed of the film across the beam of light and the positioning of the protector device of the present application in respect to such film and the feeding mechanism therefor, Fig. 2 is a diagrammatic fragmentary transverse sectional view upon the line 2—2 of Fig. 1 showing the light cut off device, Fig. 3 is a perspective view of the safety apparatus inverted and turned around from the position as shown in Fig. 1, Figs. 4 to 6 are sectional views of the safety device control, Fig. 4 being a transverse sectional view upon the line 4—4 of Fig. 3, Fig. 5 being a transverse sectional view upon the line 5—5 of Fig. 4, and Fig. 6 being a transverse sectional view upon the line 6—6 of Fig. 4, and Fig. 7 is a wiring diagram illustrating the electrical connections between the various elements of Figs. 3 to 5.

Referring particularly to Fig. 1, the compartment 10 is usually provided with a high powered arc light which projects a beam of light, indicated diagrammatically by the long arrow 11.

The film 19 is fed from the feed reel 12 across the upper sprocket 13 through the holder members 14 and 15, which hold the film in the path of the beam of light 11, the lower feed roller 16 and 17 through the sound equipment indicated diagrammatically at 9 onto the take-up reel 18.

It will be noted that the film is provided with suitable slack at 20—20.

The safety control device of the present application is indicated at A in Fig. 1 and is provided with a box 21 having the rod 22 and the follower roller 23 which contacts the film in the position 24.

The light beam cut off may be of the type shown in Fig. 2. In Fig. 2 the window 110 in the plate 111 may be cut off by the screen or plate 112 when said plate is lowered, as indicated by the arrow 113.

The plate 112 may have suitable guides, not shown, to guide its reciprocatory movement. The upper ear extension 114 of the plate 112 is pivotally connected to the end of the long arm 115 of the bell crank lever 116. The bell crank lever is pivotally mounted at 117 and its short arm is connected at 118 to the bar member 119 which is actuated by the solenoid 120.

Upon energization of the solenoid, the bell crank lever 116 will be actuated so as to throw the cut off 112 downwardly and close off the window 110 and prevent the beam of light actuating upon the film.

As best shown in Figs. 3 to 6, where the control device A is shown in inverted position as compared to Fig. 1, the box 21 may be provided with an enclosure member 25 and a lid 26 having the side flanges 27 with the screws 28 holding said side flanges in position.

The rod 22 is provided with the bearing members 29 and 30 which are held against the side walls 31 and 32 by the flanges 33 and 34 (see Fig. 4).

The roller or contact element 23 is provided with a depressed portion 35 which receives the film, the film being held in position between the elevated ridges.

The roller 23 fits upon the rod 37, the ends of which carry the nuts 38. The nuts 38 hold the rod 37 upon the side flanges 39 of the U-member 40. The base of the U-member 40 is bolted upon the transverse portion 41 of the T member 42 by the short bolts 43 extending through the slots 43a.

The stem of the T is tubular and receives the end 44 of the rod 22, said stem 42 being held in position by the set screw 45.

A spring 46 encircles the rod 22 between the bearing 30 and the T member 42 and tends to bias the rod outwardly in the direction indicated by the arrow 47 (see Fig. 4).

The rod 22 carries the collars 48 held in position by the set screws 49 between which is positioned the loosely mounted eye 50 of the rod 51. The rod 51 projects through the slot 52 (see Fig. 3) in the plate 53 held in position on the upper wall 54 of the box 25 by the rivets or screws 55. The upper end of the rods 51 has a handle 58.

It will be noted that the slot has a right angular end portion 57 into which the rod 51 may be placed, when it is desired to lock the safety device A in inoperative position. When the safety device is in operative position, the rod 51 is in the straight portion of the slot as shown in Fig. 3.

The rod 22 also carries the collar 59 held in position by the set screw 60. The collar 59 has the slotted extension 61 in which fits the stud 62 (see also Fig. 5) having the enlarged fillister head 63. The other end of the stud is fixed to the arm 64 which constitutes an extension of the contactor member 65. The contact member 65 is pivotally mounted at 66 upon the board 67.

The contactor member 65 is made of an insulating material such as Bakelite, hard rubber or some other material.

The contactor base 65 carries the contact elements 68 and 69, which, as shown, have end portions projecting upwardly through openings in the member 65, which are turned over and downwardly on the face of the contactor base 65, as shown in Fig. 4. The lower faces of these contactors 68 and 69 are designed to slide over the pairs of arcuate contact elements 70 and 71, which are attached to the insulating board 67. These contactor elements form part of the circuit which will be more fully described in connection with Fig. 7.

Referring to Fig. 7, the apparatus may be fed from a suitable D. C., indicated diagrammatically at 72.

The main switch 85 positioned outside of the unit A is located on the negative line 74 and the positive line 75. The negative line 74 is connected to the negative side of the motor 76 by the connection 77, while the positive side of the line 75 is connected to the positive side of the motor 76 by the connections 78 and 78a passing through the double throw switch 73. This switch 73 is shown as a snap switch at 73 in Figs. 3 and 4.

The switch 73 in Fig. 7 will be either thrown against contacts m, n so as to cut in the automatic control of the present application, or against contacts o, p, in which case the automatic control will be cut out and a direct connection will be made between the lines 78 and 78a.

The motor 76 will drive the feed sprockets 13, 16, 17 and also control the rotational movement of the mounts for the slide and take-up reels 12 and 13 (see Fig. 1).

As indicated in Fig. 7, with the automatic control operative, the motor circuit is constituted as follows. The positive side of the line at 75 passes through the connection 78, the switch 73, the right contact m, the connections 85c and 82 through the relay arm 83, the contact 81 past the binding post 81a of Fig. 4, the binding post 81b of Fig. 4, the connection 80 to the left contact n, the line 78a, the motor 76, and the lines 77 and 74 to the switch 85.

The circuit of the solenoid 120 is constituted as follows. The negative side of the line 74 has a connection 84 to the solenoid 120, which also has the connection 86 to the binding post point 90 (see also Fig. 4), and then to the contact 89. The relay arm 88 is designed to cooperate with the contact 89 and in turn is connected with the binding post 87 and the connections 85 and 85a, the contacts a, b, the switch element 69, the lines 85b and 85c, the contact m, the connection 78 back to position 75 (see Figs. 4 and 7).

The circuit of the relay coil 97 includes the lines 85c, 85b, contacts c, d, the switch element 68, the line 95, the binding posts 97a and 97b of Fig. 4, the lines 93 and 96a.

The circuit of the buzzer 94 extends from the contact m, the lines 85c, 85b, the contacts a, b, the switch element 69, the line 85a, the switch 92, the lines 104, 99, 96a and 74.

The lamp 101 is placed in the circuit 102 and 103 (Fig. 7) across the motor circuit relay switch 83.

The negative line 74 it is noted is connected directly to the buzzer 94, the lamp 101, the motor 76, the solenoid 120 and the relay coil 97. All switches on the other hand, namely, switches 81—83, 88—89, 73, 65—68—69, are connected to the positive.

The buzzer 94 (see Fig. 4) is provided with the coil 105, the yoke 106 and the buzzer element 107. The buzzer element 107 may be pivotally mounted, as indicated at 108 and swing back and forth between two coils 105 successively energized and deenergized.

The pilot light 101 may project through the wall 54 of the casing, as best shown in Figs. 3 and 4.

The main switch 73 may be positioned, as indicated in Figs. 3 and 4, and be readily available from the exterior of the casing 25. The buzzer switch 92 may be positioned as indicated in Figs. 3 and 4.

The main control relay R is provided with a coil 97 and the arms 83 and 88, which move in unison between contact and stop points with energization and deenergization of the solenoid 97.

In operation when the safety device of Figs. 3 to 6 is in operating position, as long as the bar 68 is in contact with the strips c, d, a circuit will be established through the solenoid 97. The solenoid 97 when energized will elevate the relay arm 83 into contact with the contact point 81 and the contact arm 88 out of contact with the contact point 89. This will close the circuit of the motor 76 and open the circuit of the solenoid 120.

As long as the switch 73 is closed to the contacts m, n, and the relay switch 83 is closed, the circuit of the lamp 101 will be energized. The lamp 101 will be lit only when the motor 76 is opening.

As soon, however, as the arm 65 has swung sufficiently far in the direction 130 to break the contact between the arcuate contacts c and d, the circuit will be opened, deenergizing the solenoid 97 and permitting the arms 83 and 88 to drop. This will open the circuit of the motor 76 and close the circuit of the solenoid 120.

As a result the shutter 112 will be thrown across the aperture 110 (Fig. 2), cutting off the beam of light 11.

The arcuate contacts a and b of the lower element 71 are associated with the buzzer 94 and when the contactor 69 passes onto the arcuate contactors a and b just before it passes off the contacts c and d, the buzzer circuit will be established and this buzzing will be continued during the time when the lever arm 65 is about to break the circuit across c and d and also during the entire time the bar 69 is in contact with and closes the circuit across the arcuate contacts a and b.

The solenoid 120 can only be operated when the circuit across the contacts a, b is closed. When the switch 65 is thrown to the dot-and-dash position of contacts 68 and 69 (see Fig. 7) by placing the rod 51 in the slot portion 57, both the motor circuit and the solenoid circuit will be opened.

To disconnect the buzzer, if desired, the switch 92 may be actuated, while to disconnect the entire safety device, the switches 73 may be thrown to contacts o, p.

It is thus apparent when the film becomes loose at the position 24 due to any stoppages or disruptions, the rod 22 will immediately move in such direction as to move the pivotal arm 65 in the direction 130, as indicated in Fig. 7. This will cause deenergization of the relay solenoid 97 and operation of the solenoid 120 to cut off the aperture 110, thus assuring that the film will not catch on fire due to being heated to ignition temperature by the beam of light 11.

The operation of the safety device takes but a few seconds and will take place in a much shorter interval than is required to heat the film up to ignition point.

At the same time the buzzer 94, which becomes active just prior to the time the circuit between the contacts c and d is broken, will continue buzzing to indicate to the operator that either the machine is in danger of being thrown off or has been thrown off.

The buzzer 94 may be replaced by a light, if desired, but as a general rule the light 101 is best utilized to indicate when the automatic safety device is in operating position.

When the rod 51 has been placed in the right angular portion 57 of the slot 52, the contact bars 68 and 69 will be off both pairs of contacts 70 and 71 as shown by the dotted lines in Fig. 7.

It will be noted that only four connections need be made into the box A indicated by the double dot and dash lines in Fig. 7. These connections are 86, 78a, 96a and 78 and they may all be included in a single cable.

It is thus apparent that the applicant has provided a simple, inexpensive attachment for moving picture machines which will greatly decrease the hazards due to fire and also will automatically throw out the machine and/or cut off the beam of light when the film is in danger of being stuck in front of or in the path of the beam of light with possibility of ignition.

The apparatus may be readily attached to motion picture machines now in use without special reconstruction or adjustment and assurance is had that the device will work over long periods of time without difficulty.

Many other changes could be effected in the particular features of safety device for moving picture projectors disclosed, and in specific details thereof, without substantially departing from the invention intended to be defined in the claims, the specific description herein merely serving to illustrate certain elements by which, in one embodiment, the spirit of the invention may be effectuated.

What is claimed is:

1. In combination, a circuit for operating an electro-magnetically operated dowser device, a motor circuit for operating the motor of a motion picture projector, a buzzer circuit for operating a buzzer, a main switch provided with a follower member contacting with the film, said switch being moved by said follower member to one position upon normal operation of the film to a second position upon undue slacking of the film preparatory to a break, and to a third position when the film has broken, a relay having an electro-magnet and a double acting switch controlling said motor circuit, said main switch controlling said electro-magnet to cause said relay switch to close said motor circuit when said switch is in first and second positions and to open said motor circuit when said switch is in the third position, said main switch also directly energizing said buzzer circuit when said follower is in the second and third positions, said main switch controlling said relay switch to control said dowser circuit and to close said dowser when said main switch is in said third position, said buzzer being actuated before said dowser.

2. The combination of claim 1, a light being also provided to indicate when said main switch is operating and a circuit actuated by said switch to illuminate said light, said circuit being closed by said main switch throughout the period of operation and means to move said switch to a position where it will open the buzzer, the relay and light circuits.

3. In combination with a moving picture projector safety control system having projection means to project a light beam feed, a motor to feed film across said projected light beam provided with a motor circuit, dowser cut off means to cut off said light beam from said film provided with an electro-magnet to control said dowser cut off means and with a dowser circuit and a double acting relay switch to control said motor and dowser circuit provided with a relay circuit and a signal provided with a signal circuit; a switch control box having a reciprocating elongated spring biased rod with a roller follower contacting said film, a pivotally mounted contactor arm, a linkage between said rod and arm, two pairs of arcuate parallel conductor bars positioned in said relay and signal circuits, said bars being radially spaced from each other and said pairs slightly overlapping and being at different radial distances from the pivot mount of the arm, offset straight radial bars on said arm riding over said respective pairs and said relay operated by opening or closure of circuits across one of said pairs of contacts by one of said bars to close a circuit to said relay to actuate said relay to energize said motor circuit when the film is normally operating and in another position to close the signal circuit to said buzzer and operate said relay circuit to open said motor circuit and to close said dowser circuit to operate said cut off means.

4. In combination with an electro-magnetically operated dowser device, a relay controlled motor circuit and a signal circuit, for a moving picture projector, a switch operated by breaking or a slack in the film, said switch being normally in off position and when in said position operating said relay to close said motor circuit and when in another position upon slacking or breakage of the film operating said relay to open the motor circuit, energizing said signal circuit to operate said signal and operating said electro-magnetically operated dowser device to cut the projected light beam.

JOSEPH JACOBSON.
NATHAN GRANATSTEIN.